INVENTORS
MAURITS TEN BOSCH
DONALD S. BAYLEY
BY
ATTORNEY

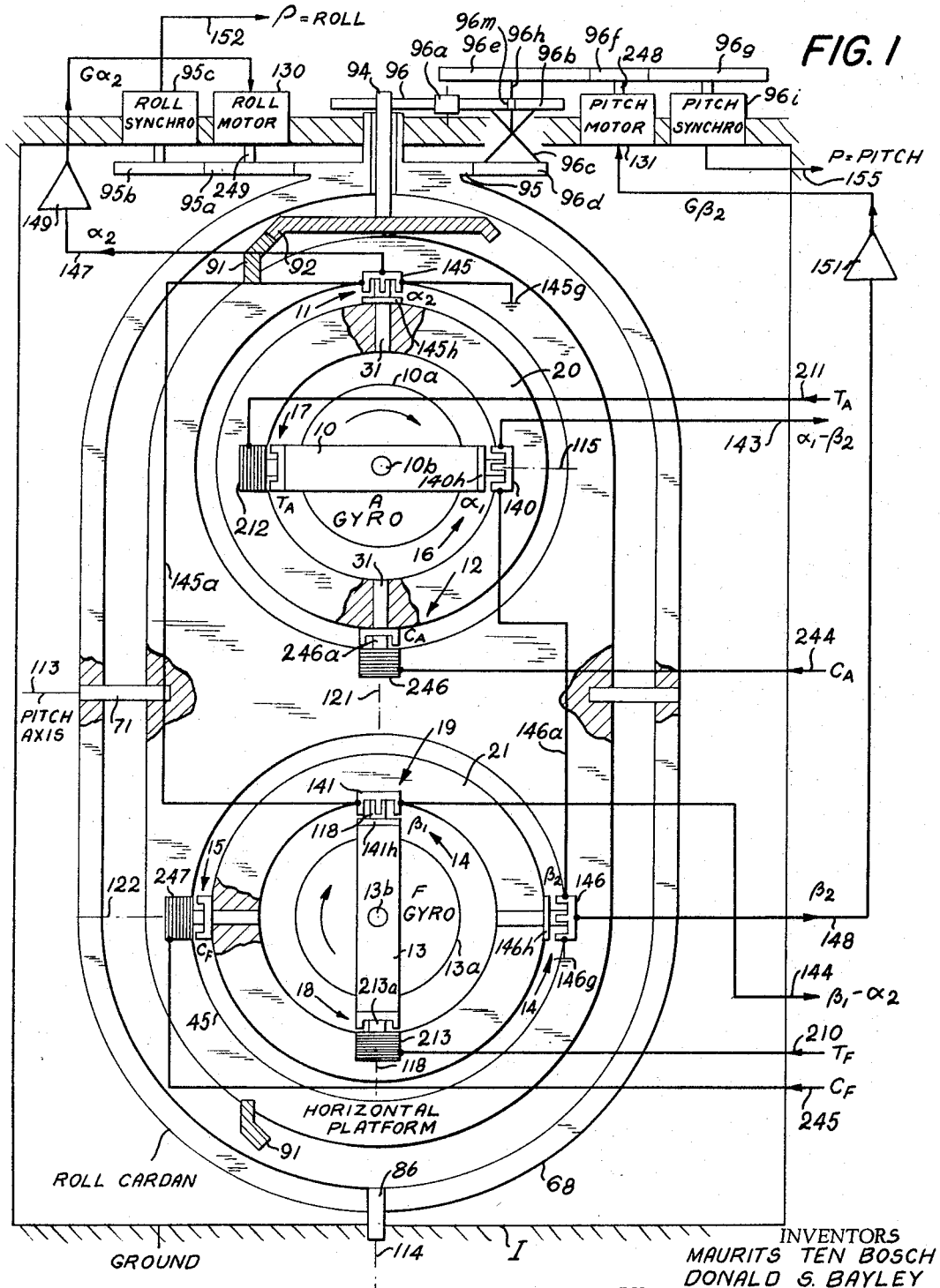

June 6, 1967 M. TEN BOSCH ETAL 3,323,380
GYROSCOPE SYSTEM
Filed Sept. 17, 1962 6 Sheets-Sheet 4

INVENTORS
MAURITS TEN BOSCH
DONALD S. BAYLEY
BY
ATTORNEY

INVENTORS
MAURITS TEN BOSCH
DONALD S. BAYLEY
BY
ATTORNEY

United States Patent Office 3,323,380
Patented June 6, 1967

3,323,380
GYROSCOPE SYSTEM
Maurits Ten Bosch, White Plains, and Donald S. Bayley, Bedford Village, N.Y., assignors to M. Ten Bosch, Inc., Pleasantville, N.Y., a corporation of New York
Filed Sept. 17, 1962, Ser. No. 224,147
6 Claims. (Cl. 74—5.34)

The present application is a continuation-in-part of application Ser. No. 475,042, filed Dec. 14, 1954, now abandoned.

The present invention relates to a gyroscope system.

The invention particularly relates to a gyroscope system which will be particularly described in connection with its application to a navigational instrument to aircraft, but which may be understood to have much wider application.

In navigational instruments for aircraft, it is necessary to reliably indicate the position of the aircraft with respect to its latitude and longitude, whether said aircraft be remote from or closely adjacent to a terrestrial pole, for example where the aircraft may be within 30° of such terrestrial pole.

It is among the objects of the present invention to provide a gyroscope system for use in a Doppler-inertial type navigator, in which accelerations will be accurately integrated over a wide range with a small accurate and simplified system.

Another object is to provide a gyroscope system of the character set forth, in which no correction for coriolis acceleration is required and in which earth rotation corrections may be automatically introduced.

Another object is to provide an integrating accelerometer system of the gyroscope type which is readily applicable to measuring the position of aircraft or other vehicles in respect to the surface of the earth, which will automatically and reliably constantly supply information as to the position of the aircraft in respect to the surface of the earth by use of a relatively simple, lightweight, small, compact mechanism.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a plurality of gyroscopes associated with each other on the same or connected platforms and so arranged that one gyroscope will measure the fore and aft velocity components, while the other gyroscope will measure athwartship velocity components.

Although the gyroscopes may be provided with horizontally located spin axes, they desirably are provided with aligned or parallel vertical spin axes, and the rotors may rotate in the same or opposite directions.

The gyroscopes are balanced about their inner gimbal axes but pendulous about their outer axes and are so tuned that each gyroscope will behave as an 84 minute pendulum and may be used to measure accelerations without being essentially displaced from the vertical.

Since the gyroscopes stay vertical, they may also be used to furnish signals or information which will stabilize the horizontal platform for the system.

Mercury flotation bearings whose static friction is less than 20 micro inch ounces are desirably used on the gimbal axes.

The fundamental outputs of the gyroscope system or inertial unit will be the component of the horizontal velocity of the airplane along the inner gimbal axes of the gyroscopes and the direction of the vertical with respect to the airplane.

Associated with this pendulous unit, in the preferred combination, will be a heading reference unit including an azimuth gyroscope. This unit will indicate the true heading of the aircraft once a correct initial value has been set.

There will also be associated with the gyroscope system a Doppler measurement unit to measure the speed of the aircraft along its fore and aft axis.

Directly associated with the gyroscope system will be a computing unit which will receive and store the components of the horizontal velocity and resolve them into changes in the azimuth direction.

This computing unit will desirably include a compensating velocity unit and a storage resolver.

Normally, the total displacement of a gyroscope around its tilting axis is proportional to the integral of the acceleration, acting parallel to that axis, and the compensating velocity unit will measure this total displacement.

The compensating velocity unit will contain two motors, each controlled respectively by the small tilt axis displacements of the corresponding gyroscopes.

The motor shafts are so arranged as to develop a series of torque pulses whose frequency is the shaft speed, which when applied to the cardan axes of the gyroscopes cause opposing precession to hold the tilt axis displacement essentially at zero.

The storage resolver unit will preserve the velocity vector and continuously resolve it into components parallel to the axes of the gyroscope system. This permits the velocity changes furnished by the motor shafts to be added to the velocity vector components.

The storage resolver desirably contains two rollers and disk plate integrators, the rollers of which are cross-connected.

This combination gyroscope system will be associated with a computer indicating unit which will include a latitude and longitude computer, a velocity resolver and a correction unit.

The latitude and longitude computer will receive information through the velocity resolver of the correction unit from the Doppler unit, the azimuth gyroscope unit, the heading reference unit with its associated computer unit and storage resolver indicating the latitude and longitude at all times, making suitable corrections for the earth's rotation and being accurate to a high degree even when directly over or in close proximity to the terrestrial poles.

In the preferred arrangement, each gyroscope of the double pendulous unit may rotate about the tilt axis in a gimbal ring and each gimbal ring may rotate about a cardan pendulous axis against a servo platform.

The axes of the two gyroscopes are arranged at two angles to the identical axes of each other and on the gudgeons are preferably mounted flotation units floating in mercury to compensate for the weight of the gyroscopes.

The electrical connections are desirably made through leaf contact points in the open gudgeons.

Suitable electrical pick-up or transformers are mounted to measure the relative rotation of each gyroscope about the tilt axis against the rotation of the cardan of the other gyroscope about its axis.

A complete casing is mounted upon the platform of both gyroscopes to prevent air circulating around the system and the platform in turn is mounted in cardanic suspension.

The outer axis of this suspension will be parallel to the length axis of the plane and will therefore constitute roll axis while the inner axis will constitute horizontal pitch axis.

Servo motors outside the housing will drive both axes through suitable gearing and keep the pick-up centered.

Servo motors outside the motor or cover will drive both axes through suitable gearing and keep the pick-up centered and the platform will follow the motion of the gyroscopes and will be held horizontal.

The important feature of the present invention resides in the fact that each gyroscope is mounted in a separate gimbal in a two-axis suspension instead of being mounted only through the tilt axis against a pendulous platform, with the result that there is a great reduction in weight and space and in the moment of inertia about the pendulous axes.

In the preferred system, each gyroscope of the double gyroscope system will be provided with a feed-back which in part will feed back to the same gyroscope to keep the spin axis vertically aligned and will in part feed back to the other gyroscope to keep its spin axis vertically aligned, with the residual information going into a computing system to enable computation of the velocity components.

The common platform or the associated platform for the two gyroscopes of the double system is constantly maintained in horizontal position by roll and pitch servo mechanisms.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a diagrammatic plan view of one form of gyroscope system according to the present invention;

Figure 1A:
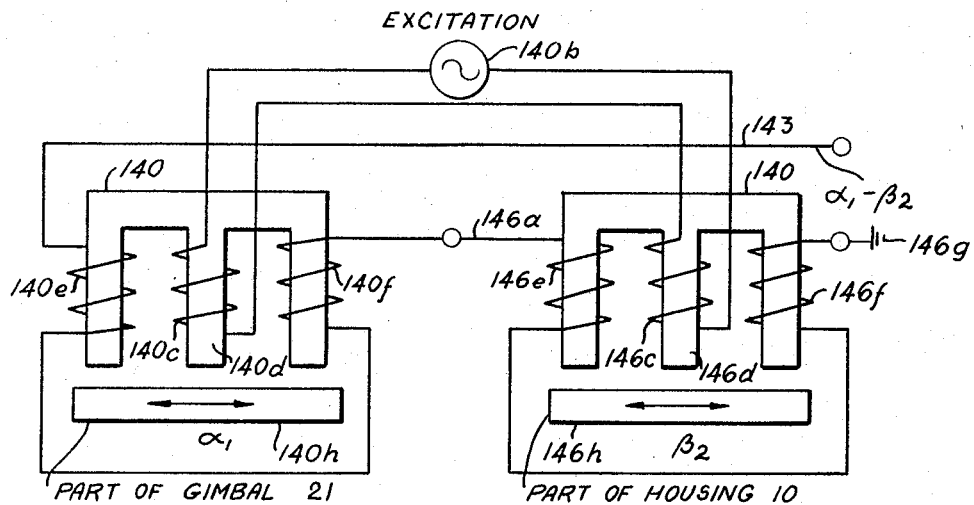
FIG. 1a is a diagrammatic layout of two pick-off units connected in series.

The basic inertial or gyroscope unit, as shown in FIG. 1, is provided with two gyroscopes, and F gyro for measuring fore and aft velocity components and an A gyro for measuring athwartship velocity.

For example, when the aircraft is flying in north-south direction, the gyroscope A will measure the east-west velocity components while the gyroscope F will measure the north-south velocity components, the two gyroscopes measuring the velocity components at right angles to each other.

The gyroscopes 10 and 13 include housings in FIG. 1, and also the spinning rotors indicated at 10a and 13a in FIG. 1. The housings 10 and 13 act as the inner gimbals or cardans, whereas the outer gimbals 20 and 21 will carry the housings 10 and 13. In turn the outer cardans or gimbals 20 and 21 are carried by the platform 45 and the platform 45 is carried in turn by the outer roll cardan 68.

The roll cardan 68 is mounted in respect to the ground or vehicle by a roll axis 249.

In the embodiment shown in FIG. 1, both the A and F gyros turn in the same direction, and in normal operation the spin axes 10b is positioned directly over and aligned with the spin axis 13b.

Figure 2A:
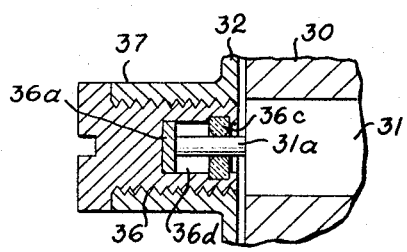
FIG. 2a is a detail fragmentary sectional view of the end jewelled bearing associated with the floating bearing.
Figure 2:
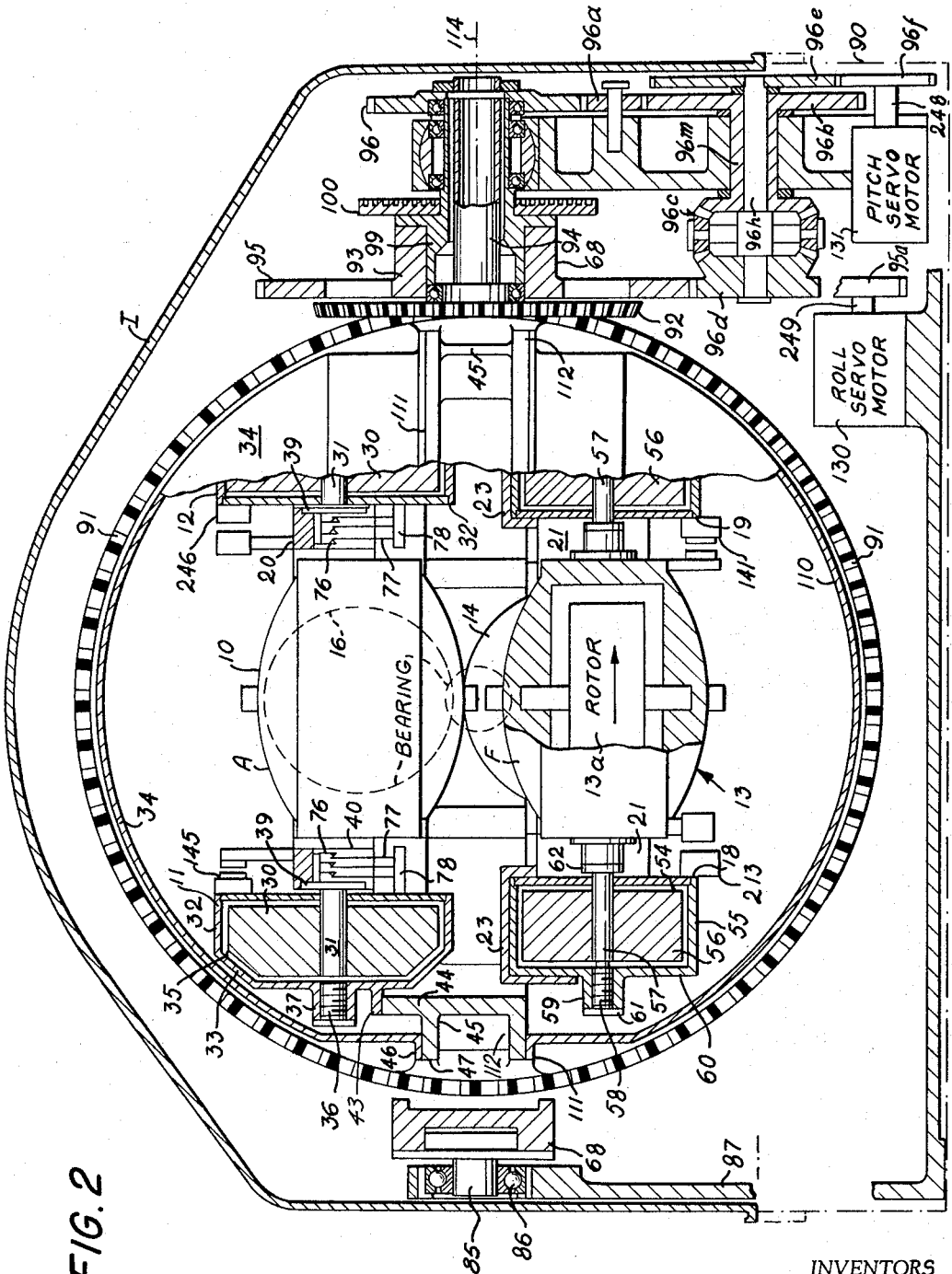
FIG. 2 is a transverse vertical sectional view through the gyroscope system showing in section the bearings and cover or casing.
Figure 3:
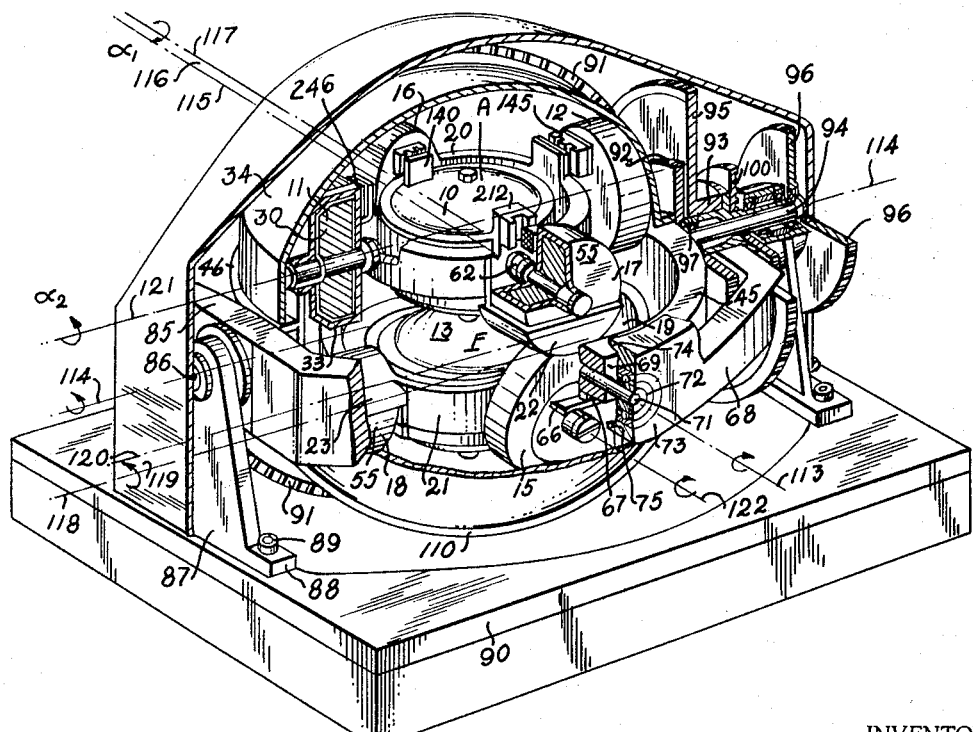
FIG. 3 is an isometric side view partly in section of the gyroscope system mounted upon its platform.

The specific gyroscope system is shown in detail in FIGS. 2 and 3 with gyroscope A positioned directly above gyroscope F and with their spin axes vertically aligned and so pendulously suspended as to be directed toward the center of the earth at all times.

Figure 5:
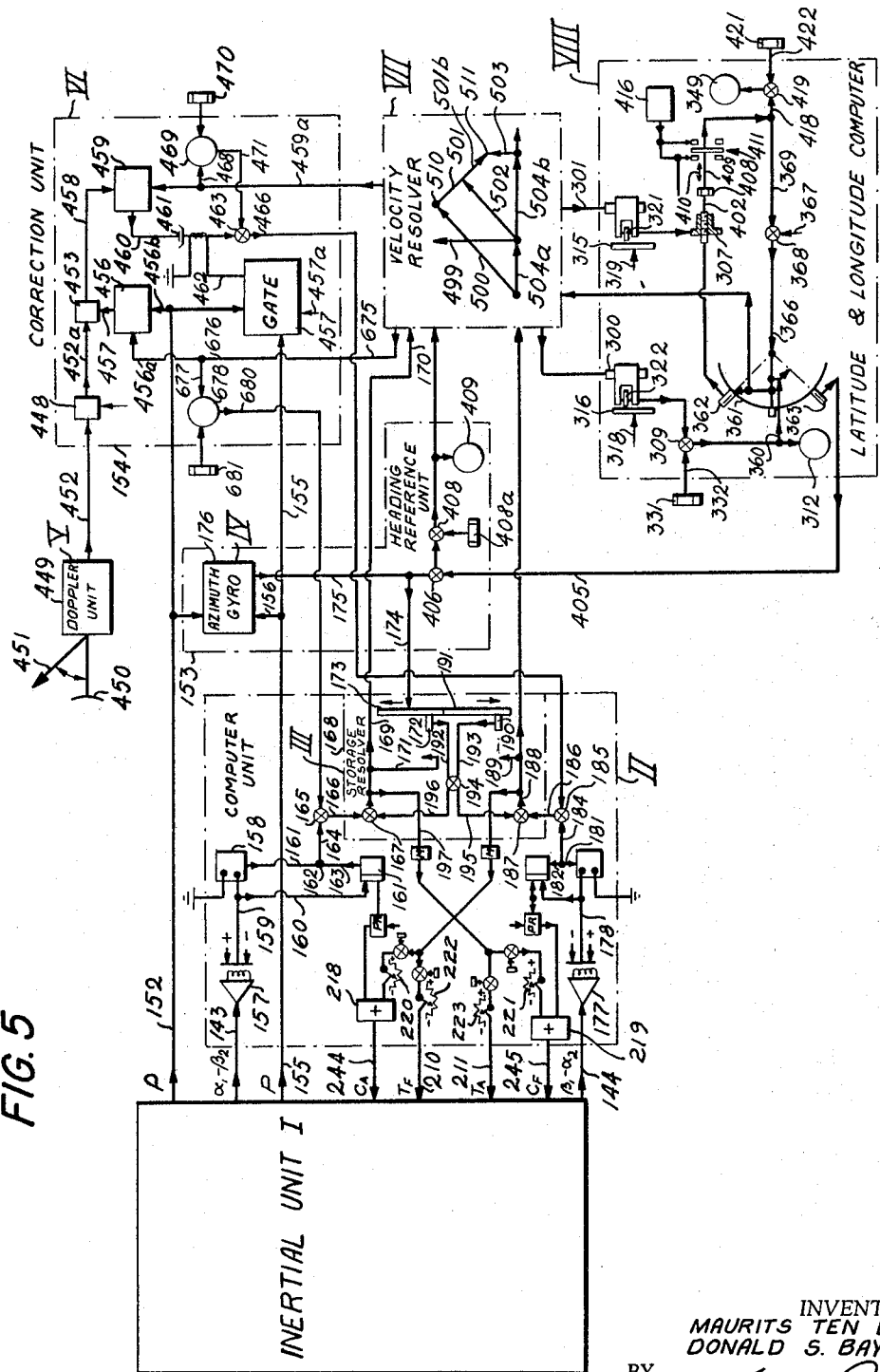
FIG. 5 is a diagrammatic layout of the gyroscope system and associated units of FIG. 4, also showing the Doppler unit, the azimuth gyroscope and heading reference unit, the correction unit, the velocity unit and the latitude and longitude computer.

In general, the basic arrangement is shown best in FIG. 5, in which there is provided an inertial unit I which supplies information to the computer unit II which includes a storage unit III.

This information is then processed together with information from an azimuth gyroscope IV and a Doppler unit V. This process takes place in a correction unit VI and in a velocity resolver unit VII. The information is fed back to the inertial unit for restoring the gyros to null position, while the correct information is then supplied to the latitude and longitude computer unit VIII.

The present invention is particularly directed to the inertial unit I.

In the gyroscope system, FIG. 1, there is a common platform 45 which is not pendulously suspended, and the rotors 10a and 13a rotate in the same directions. In FIG. 1 the outer cardans or gimbals 20 and 21 are separate from the platform 45 and are pendulously suspended in respect thereto.

Referring to FIG. 1, there is shown an upper or A gyroscope 10 with outer cardan or gimbal bearings 11 and 12 and a lower or F gyroscope 13 with corresponding outer gimbal or cardan bearings 14 and 15. These outer cardan bearings connect the gimbal rings to the platform 45.

The A gyroscope is provided with the tilting bearings 16 and 17 and the F gyroscope is provided with the tilting bearings 18 and 19. These tilting bearings connect the gyroscope housings 10 and 13 to the gimbal rings 20 and 21.

As shown in FIG. 2, the cardan bearings 11 and 12 are provided with the floating cylindrical bodies 30 which are mounted upon the shafts 31 passing through the casings 32.

The forward edge of the casing 32 (see FIG. 2) is beveled as indicated at 33 to clear the dust cover or dust housing 34. All around the cylinder 30 is left a small space 35 which is filled with mercury and acts to float the cylinder 30.

As shown in FIG. 2a, outer end of the shaft 31 has a forward portion 31a which projects into the jewel bearing assembly 36 fitted into the sleeve 37 projecting axially from the case 32.

The bearing pin 31a projects through the annular jewel 36c in the recess 36d and bears against the thrust disk 36a.

The inner end of the shaft 31 (see FIG. 2) is provided with an enlargement or collar 39, fitting in a cavity 40 in the A cardan ring 20, as best shown in FIG. 2. The cavity 40 receives the slip rings 76–77 for electrical connections.

A series of contact points 76 are mounted in the cavity 40 in the A cardan 20 with the centers of the contact points aligned with the axis of rotation of the A cardan. Resilient electrical electrical conducting leaf springs 77 are secured to insulated block 78 which is in turn mounted to the bearing housing 30. The springs 77 bear against the contacts 76 and thereby transfer electrical energy through the rotating axis 121 of the A cardan 20.

The casing 32 will have an outstanding foot or leg 43 which rests upon the upper extension 44 of the horizontal platform 45. The lower portion of the dust cover 34, as indicated at 46, is flanged outwardly to rest upon the horizontal shelf 47 of the platform 45 (see FIG. 2).

The tilting bearings are similarly constructed as indicated by bearing 18 at the lower left of FIGS. 2 and 3. Each tilting bearing 18 (see FIG. 2) has a casing 55 which receives the floating cylinder 56 having a spacing therefrom indicated at 54 which is filled with mercury.

The cylinder 56 is mounted upon an axle or gudgeon 57. The axle or gudgeon has a threaded extension 58 received in the nipple 59 projecting from the wall 60 of the housing 55.

In FIG. 2, the plug 61 of the construction as shown in FIG. 2a closes the sleeve 59. The sleeve 59 may receive a jewel bearing. The inside end of the shaft 57 is provided with a collar 62.

In FIGS. 2 and 3, the outside cardan 21 has a semi-cylindrical extension or housing 23 which fits over the upper part of the housing 55 for the tilting bearing 18.

In FIGS. 2 and 3, the housing 23 fits or rests on the top of the housing 55 in the lower or F gyroscope while the housing 22 in FIG. 3 fits below the tilting bearing housing 55 in connection with the upper or A gyroscope.

By these semi-cylindrical housings 22 and 23 for the A and F gyroscopes the rings 20 and 21 will be supported upon the bearings 16, 17, 18 and 19. The housing of the bearing 15 is also provided with the extension 66 which is mounted on the element 67 forming part of the horizontal platform 45 (see FIG. 3).

In FIGS. 2 and 3 the horizontal platform ring 45 encircles and is located between the A and F gyroscopes 10 and 13 and the ring 45 is carried by the roll cardan 68. The portion 69 of the ring 45 has a shaft 71 which has a ball bearing 72 in the section 73 of the roll cardan 68. The section 73 of the roll cardan 68 has inwardly directed flanges 74 and 75 which extend below and above the platform 45.

The shaft or stud 71 forms a bearing connection between the horizontal platform and the roll cardan 68. The sides of the roll cardan 68 are flattened as indicated at 85 and are provided with the bearings 86 mounted in the upper ends of the upwardly extending arms 87. The arms 87 are mounted by the feet 88 and the bolts 89 upon the base structure 90. Fixed to the platform 45 is the pitch axis ring gear 91 (see FIGS. 2 and 3).

The ring gear 91 is shown diagrammatically in both FIGS. 1 and 2 and it is mounted in fixed relationshp with the platform 45 so that it will turn with the platform 45. The pitch axis ring 91 meshes with the inner pitch gear 92 (see FIG. 2) which is fastened to the shaft 94. Pitch gear 96 is driven from the pitch servo motor 131, and gear 92 will turn with it. When the gear 92 is moved it will move the ring gear 91 and turn the platform 45 (see also FIG. 2).

Associated with the gear 92 is another pitch gear 96 which is mounted on the hollow shaft 94. These pitch gears 92 and 96 are driven by a pitch servo mechanism 131.

Between the pitch gears 92 and 96 is positioned the roll axis drive gear 95 which has a central hub bearing 93 on the tubular member 99. Associated with the hub 93 and member 99 is the grooved plate member 100. The plate 100 provides for electrical slip rings with brushes to carry electrical connections shown by arrows at the right of FIG. 1.

The roll gear 95 is driven by a roll servo motor 130 (see FIG. 1).

Corresponding to the upper dust cover 34 will be the lower dust cover 110 which has the upper flanges 111 mounted on the outwardly extending flange portions 112 of the platform 45 (see FIG. 2).

The electrical and mechanical connections corresponding to FIGS. 2 and 3 are also shown diagrammatically in FIG. 1.

Figure 4:
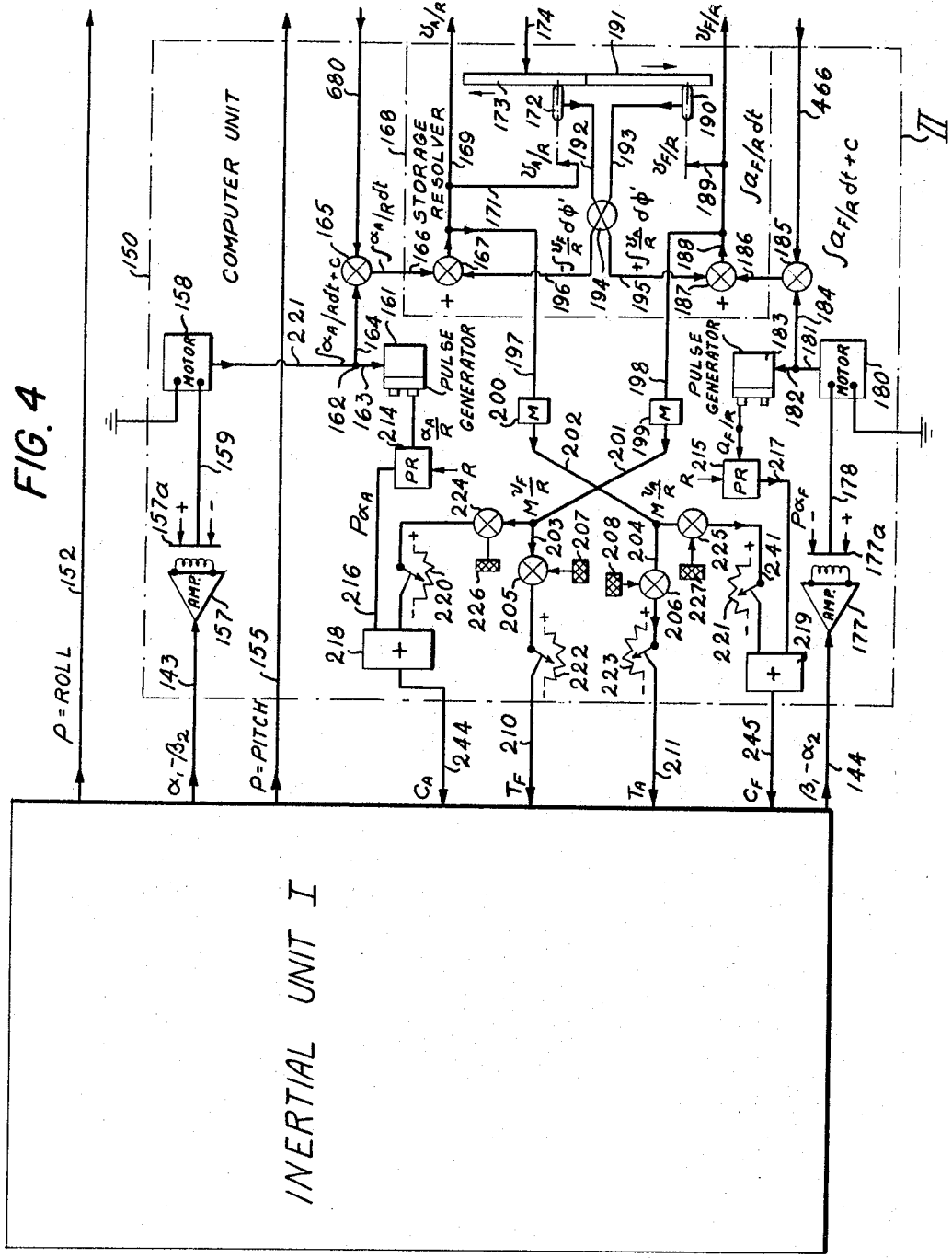
FIG. 4 is a diagrammatic layout of the gyroscope system with diagrammatic showing of its associated computer and storage resolver units.

The inertial unit is shown diagrammatically in FIG. 1 and will be duplicated in the boxes indicated as inertial unit I in FIGS. 4 and 5, and is shown in diagrammatic section in FIG. 2 and in a partial perspective section in FIG. 3.

In the unit I of FIG. 1 there are two gyroscopes, including a housing or enclosure 10 for the A gyro and a housing or enclosure 13 for the F gyros with spinning rotors 10a and 13a.

Referring to FIG. 1, the gyroscopes are shown in side by side relationship but actually as shown in FIGS. 2 and 3 they are positioned one above the other with their spin axes 10b and 13b vertically aligned.

The housings 10 and 13 will act as inner gimbals or cardans. The A gyro as shown in FIG. 1 has a torquer 212 at one side and a pick-off 140 at the other side, both on the axis 115, which is connected to the housing 10.

The shaft on the axis 115 will extend to and be connected to the outer gimbal ring 20 which is provided with the shaft 31 on the axis 121. The shaft 31 in turn will act upon the electrical pick-off 145 at one side and upon the torquer 246 at the other side respectively and will cause the pick-off to create the signal $\alpha_2$. At the same time the pick-off 140 will generate the signal $\alpha_1$.

In the F gyro shown in FIG. 1 the housing 13 will have the pick-off 141 at its upper side and the torquer 213 on its lower side, both associated with the shaft 118 leading to the outer gimbal 21. The outer gimbal 21 in turn will be connected by the shaft on the axis 120 to the platform 45 with the torquer 247 being located at one side of the gimbal 21 and the pick-off 146 being positioned at the other side of the gimbal 21.

The line 146a from the pick-off 146 on the F gyro leads to the pick-off 140 on the A gyro and the signals will be subtracted and pass outwardly to the line 143 at the right of FIG. 1. This is indicated diagrammatically in FIG. 1a.

In FIG. 1a the pick-off 146 is shown as connected in series with the pick-off 140 and provided with an A.C. generator 140b which has connections to the coils 140c and 146c on the middle legs 146d and 140d of the E transformers which are wound in opposite directions. The coils 146e and 146f and the coils 140e and 140f will also be wound in opposite directions and will be connected by the line 146a and lead out through the line 143 to the exterior of the inertial unit.

The end of the line 146h at the other side of the pick-off 146 will lead to the ground 146g. The armatures 140h and 146h will be mounted on and form part of the housing 10 and gimbal 21. As the armatures 140h and 146h are rotated in respect to the pick-offs 140 and 146 they will generate signals which are subtracted from one another and then pass outwardly through the line 143 to the computer unit II (see also FIG. 1).

The same will also occur in connection with the pick-off 145 of the A gyro and the pick-off 141 of the F gyro.

As indicated, the pick-off 145 will be grounded as indicated at 145g and it will transmit a signal through the line 145a to the pick-off 141, which in turn will be so connected that the signals will subtract and then pass outwardly through the line 144. The armature 145h of the pick-off 145 will turn with and be part of the outer gimbal 20 of the A gyro.

On the other hand, the armature 141h will be part of or mounted on the housing 13 of the F gyro.

Opposite the pick-off 140 on the A gyro will be the torquer 212 which is actuated through the signal transmitted by the line 211. Opposite the pick-off 145 will be the torquer 246 which is actuated by the signal transmitted through the line 244.

With the F gyro the torquer 213 is opposite the pick-off 141 and will act upon the housing 13, receiving its actuating signal through the line 210. The torquer 247 will be opposite the pick-off 146 and will receive its signal from the line 245.

Figure 1B:
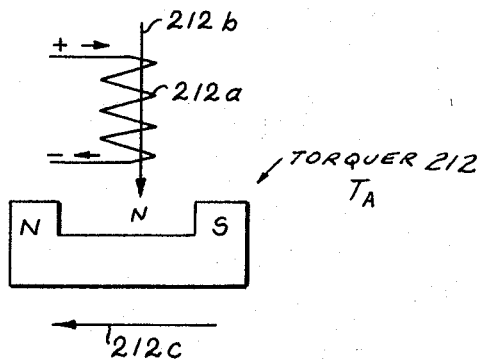
FIG. 1b is a diagrammatic layout of a torquer as utilized in the layout of FIG. 1

These torquers are diagrammatically shown in FIG. 1b and when the current flows down through the coil 212a the field will be in the direction indicated by 212b. This will result in a torque being applied in the direction 212c. The torquers 212 and 246 of the A gyro and 213 and 247 of the F gyro may all be of the construction as shown in FIG. 1b.

The roll motor 130 in FIG. 1 through the shaft 249 will drive the gear 95a which meshes with and drives the gear 95. The gear 95 turns with the roll cardan 68.

The gear 95a will also drive the gear 95b and the roll synchro 95c.

In FIG. 1, the shaft 94 driving the gear 92 from the pitch motor 131 (see FIG. 1) is actuated from the differential gear 96b, the pinion 96a and the gear 96.

The shaft 94 turns the ring gear 91 on the platform 45 by the gear 92.

The roll synchro 95c will generate a roll signal which will be transmitted through the line 152.

In FIG. 2 at the lower right, the gear 95a and roll servo motor 130 is shown out of position, but the gear 95a will mesh with and drive the gear 95.

In connection with the pitch servo motor 131 as illustrated in the upper part of FIG. 1 and in the lower part of FIG. 2, this motor will be actuated by an amplifier signal received from the pick-off 146 which will pass through the line 148 to the amplifier 151 and to the pitch motor 131. The pitch motor 131 has a shaft 248 driving the gear 96f which in turn drives the gear 96e. The gear 96e will drive the shaft 96h, and the differential 96c which is connected to a gear 96b by the sleeve 96m (see FIG. 2). The gear 96f driven by the pitch servo motor 131 will also drive the gear 96g (see FIG. 2). The gear 96g will drive the pitch synchro 96i which will transmit a pitch signal through the line 155 to the associated equipment indicated in FIGS. 4 and 5.

Figure 6:
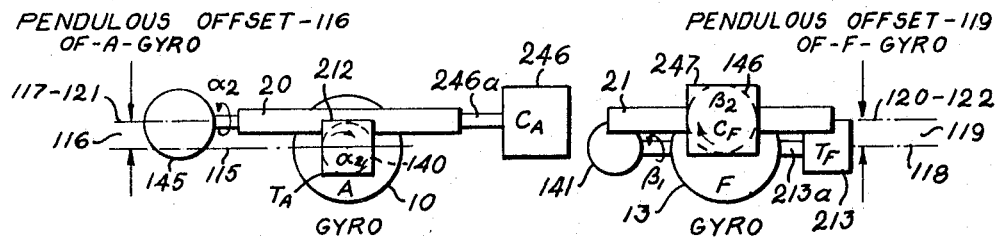
FIG. 6 is a diagrammatic side elevational view indicating the pendulous off-set of the gyroscopes of the gyroscope system.

Referring to FIG. 3, it will be noted that the shaft 71 extends along the pitch axis 113 while the shafts of the bearings 86 and 94 extend along the roll axis 114. The tilting axis 115 of the A gyroscope (see also FIG. 6) has a pendulous offset as indicated at 116 from the level 117 of the axis 121. The tilting axis 118 of the F gyroscope has a pendulous offset 119 from the level 120 of the axis 122. The outer cardan or gimbal axes as indicated at 121 and 122 are not displaced.

The electrical signals or electrical information as electrical voltages from the inertial unit of FIGS. 1, 2 and 3 is then transmitted to the computer unit and the storage resolver unit, as shown in FIG. 4.

As shown in FIG. 1, pick-offs 140 and 146 on the axes 115 and 122 of the A gyroscope will give respectively electrical angular information which passes outwardly of the inertial unit as indicated at 143. The electrical pick-offs 145 and 141 on the cardan axes 121 and 118 of the A and F gyroscopes will supply angular information as indicated at 144.

The electrical angular information 143 and 144 will go to the computer unit II. The electrical information 147 and 148 from pick-offs 145 and 146 will be supplied to the roll servo motor 130 and the pitch servo motor 131 respectively through the amplifiers 149 and 151 to drive the roll cardan 68 and the platform 45 respectively.

Roll information will be supplied at 152 to the azimuth gyroscope unit and also to the correction unit 154. Pitch information at 155 will be supplied to the azimuth gyroscope unit 153 at 156 and also to the correction unit 154.

The information 143 as to the gyroscope A tilt axis displacement is transmitted to the transformer 157 and thence to the motor 158 by the line 159.

It will be transmitted from the motor as a shaft rotation along lines 221 and 163 to the pulse generator 161 and to the mechanical differential 165 through line 164 from junction 162. From differential 165 it passes into the storage resolver 168 through line 166.

The pulse generators 161 and 183 create a predetermined number of pulses, for example 180 per revolution of the motor.

In the storage resolver part of the information from the differential passes, as indicated at 169, to the velocity resolver at 170, and part is transmitted at 171 to change the position of the roller 172 upon the rotating, integrating disk 173. The disk 173 is driven from the line 174 by information at 175 from the azimuth gyroscope 176.

In respect to the F gyroscope tilting axis angular information 144 as an electrical voltage, this passes into the computing unit to the transformer 177 and thence through the lines 178 and 179 to the motor 180.

The motor 180 transmits information as a shaft rotation, as indicated by the line 181 and 182, to the pulse generator 183 and it also transmits information through the lines 184 to the differential 185 and then into the storage resolver unit 186 to the differential 187.

The information then passes, as indicated at 188 and 189, to adjust the position of the roller 190 upon the integrated disk 191 which is driven by contact or meshing with the integrated disk 173.

The rollers 172 and 190 will transmit information, as indicated by the lines 192 and 193, to the cross-over 194 and thence back, as indicated at 195 and 196, to the differentials 167 and 187.

Information from the differential will also be transmitted from the lines 169 and 188 to the branches 197 and 198 to the devices 199 and 200. From the devices 199 and 200 the information passes by the line or shafts 201 and 202 and 203 and 204 to the differentials 205 and 206.

At the differentials 205 and 206 there may be applied the initial erection corrections by the knobs 207 and 208. Thence the corrected information is converted from mechanical shaft rotations into electrical quantities by potentiometers 222 and 223 and then flows through connections 210 and 211 back to the inertial devices, the information from the line 210 being transmitted to the torquer 212 of the F gyroscope while the information from the shaft or line 211 is transmitted to the torquer 213 of the A gyroscope.

At the same time from the devices 214 and 215 there is transmitted information through the connections 216 and 217 to the electrical adder units 218 and 219. Information from lines 201 and 202 also pass to the differentials 224 and 225 at which initial erection corrections are applied by knobs 226 and 227. Thence the corrected information is converted from mechanical shaft rotations to electrical quantities by the potentiometers 220 and 221 from whence the information flows to the electrical adder units 218 and 219. From these adder units, the total information passes through the lines 244 and 245 to the cardan axis torquers 246 and 247 of the A and F gyroscopes, respectively.

The information received by the torquers 246 and 247 will be angular velocity information and will compensate for the various spacing of the vehicle or aircraft from the center of the earth.

By the arrangement shown, the two pendulous, tuned, vertical A and F gyroscopes will measure and integrate the acceleration at speeds up to 700 knots without being affected by the manoeuvers of the aircraft, with an accuracy within a few percent.

The A and F gyroscopes are each balanced about their inner gimbal axes but are pendulous about their outer gimbal axes, and each gyroscope is so tuned that it will behave as an 84 minute pendulous and may be used to measure acceleration without being essentially displaced from the vertical.

In addition, the gyroscopes may be used to furnish information or signals to servo mechanisms 130 and 131, as shown in FIG. 4, which will stabilize the horizontal platform 45.

The computer unit as shown in FIG. 4 receives, restores and resolves the velocity vectors measured by the A and F gyroscopes in the inertial unit of FIG. 1.

The two motors of the servo mechanisms 130 and 131 are controlled respectively by the small tilting axis displacements of the A and F gyroscopes through the transmission lines 147 and 148.

The signals transmitted through the lines 143 and 144 will drive pulse generators 161 and 183 and the lines 244 and 245 will supply pulses proportional to the motor speeds, which pulses are fed into the torquers $C_A$ and $C_F$ causing precession movement on the axis on the outer tilt axes which tend to restore the displacement of the gyro to the null position. If the pulses have constant amplitude, the displacement of each motor shaft is then proportional to total tilt axis displacement.

If the inertial unit of FIG. 1 were not rotating around a vertical axis, the displacement of the motor shaft would measure the corresponding horizontal velocity component. Actually, such a rotation with respect to a fixed coordinate system is always present, and changes in motor shaft position represent horizontal velocity increments whose spatial direction is continuously changing.

The purpose of the storage resolver of FIG. 4 is to preserve the velocity vector and continuously resolve it into components parallel to the tilting axes 109 and 112 of the inertial unit. This allows the velocity changes furnished by the motor shaft to be added to the velocity vector in the proper directions.

The roller and disk integrators 172–173 and 190–191 have disk rotations which are proportional to the spatial rotation of the system around a vertical axis and hence are furnished directly from the output of the azimuth gyroscope 176.

The rollers 172–190 are cross-connected as indicated at 194 and their displacements from the centers of the disks are proportional to the desired velocity components. Changes in a motor shaft position are added directly to the corresponding roller displacement.

In operation of the inertial unit, the computer unit and the storage resolver unit, the signals are taken off the pick-ups 145 and 146 and are fed into the lines 143 and 144 to the motor system 157 and 158 in the upper part of the computer unit and 178 and 180 in the lower part of the computer unit.

Each motor shaft will drive a pulse generator to produce voltage pulses which are supplied to the cardan axis torquers 246 and 247.

Since both the sign of the pulses and direction of motor rotation are determined by the sign or direction of the signals transmitted from the pick-offs 145 and 146, the average torque applied to each gyroscope must cancel the moment caused by the acceleration, and displacement of the motor shaft must be proportional to the integral of acceleration or to the total displacement integrated at 145 or 146 that would occur if a direct pick-off were used and the torque feed back loop were opened.

By measuring the information from pick-off 145 against the cardan of the F gyroscope and the information from the pick-off 141 against the cardan of the A gyroscope, errors in the action of the servo system are avoided.

The horizontal components of the acceleration of the airplane cause a proportional precession reading of the respective gyroscopes around their tilting axes which will give rise to the signals given off by the pick-offs 140 and 141.

The information supplied to the lines 147 and 148, which is used to actuate the roll servo mechanism 130 and the pitch servo mechanism 131 respectively, arises from the pick-offs 145 and 146 on the cardan axes of the gyroscopes.

To summarize the operation of the inertial unit I, the torquer 212 applies torque around the tilting axis of the gyroscope A, which causes the gyroscope A and its cardan 20 to precess at a rate proportional to the torque around the cardan or pendulous axis 117.

The torquer 246 applies torque around the pendulous axis 117 which causes the gyroscoype A to precess around the tilting axis 115.

The information supplied to the torquer 212 by the line or conduit 211 is essentially proportional to the angular velocity component athwartships or $V_A$ with which the aircraft is moving over the surface of the earth. The torquer 212 keeps the cardan ring or outer gimbal 20 horizontal and causes the signal supplied through the channel 147 through the amplifier 149 with the gain G to actuate the roll servo mechanism 130. This roll servo 130 drives the horizontal platform 45 through the roll cardan 68 to maintain the horizontal position of such platform.

Both the torquers 212 and 213 operate on the tilting axes 115 and 118 of the gyroscopes A and F whereas the horizontal platform is kept horizontal by means of the servo mechanisms 130 and 131, which are actuated by the error signals obtained from the lines 147 and 148.

Associated with the roll and pitch servo mechanisms 130 and 131 may be a torque amplifier of the electrical type with actuating coils or a screw and nut arrangement.

The sector devices 161 and 183 receive the velocity output information from the inertial unit I through the lines 143 and 144, which information passes through the amplifiers 157 and 177.

These amplifiers actuate the relays 157a and 177a which operate the reversible motors 158 and 180.

The motor 158 will operate to keep the error transmitted through the conduit 143 at zero and to hold the A gyroscope centered around the tilting axis.

The signal transmitted through the line 143 to the motor 158 will be proportional to the angular displacement of the gyroscope A around its tilting axis.

From the motor 158 the signal passes through the line 221 to the differential 165, where it may be provided with an initial setting correction. The signal then will be transmitted through the line 166 and the differential 167 to the line 177 to correct the position of the roller 172 of the upper integrator shown at the right of FIG. 4 in the storage resolver.

The disk 173 of the upper integrator is driven by the shaft 174 from information supplied by the azimuth gyroscope 176, which has not been corrected for the earth's rotation.

From the roller 172 of the integrator the information will then pass through the lines 192 and 195. It will be noted that the disks 173 and 191 of the upper and lower integrators are driven in opposite directions, and the information which is supplied to change the position of the rollers 172 and 190 is velocity information derived from the inertial unit I.

In view of the fact that the rollers 172 and 190 of each integrator through the differentials 167 and 187 correct the roller displacement of the other integrator, there will be complete correction for the rotation of the aircraft in azimuth as measured in a system fixed in space and not fixed with respect to the earth.

The lines 680 and 466 will also supply a correction which may be obtained from the Doppler V as well as an initial correction from the initial setting members 681 and 470 of the correction unit VI.

The lines 197 and 198 will supply information to the boxes 199 and 200, which in turn will supply electrical signals at 201 and 202 to the differentials 205 and 218 and 206 and 219.

The boxes 199 and 200 represent gain controls which adjust the velocity signals to the angular momentum of the gyroscopes. The boxes 199 and 200 will correct for change in speed of the gyroscope rotors and change in frequency of the supply voltages.

The boxes 214 and 215 represent gain controls which adjust the pulses coming from the pulse generators 161 and 183 for the distance of the airplane from the center of the earth or for the latitude of the aircraft.

The lines 160 and 179, which also connect to the pulse generators 161 and 183, correct for the sign of the signal whether it is plus or minus, depending upon what sign is coming from the pick-offs.

The devices 214 and 215 as well as the devices 199 and 200 are tuned to give Schuler tuning, which is an 84 minute tuning. As a result the pendulous suspension of the inertial unit I will not swing upon acceleration.

The information supplied to the devices 214 and 215 at R will correct for the altitude of the aircraft above the earth as well as the earth's radius at this point.

In the present unit described, it is not necessary to correct for coriolis accelerations because this correction is not made until the information is transmitted to the latitude and longitude computer VIII. In the latitude and longitude computer, correction is there made for the rotation of the earth.

The Doppler unit V is provided with an antenna 450. The arrow 451 shows the fixed angle between the axis of antenna 450 and the roll axis of the airplane. The Doppler unit V may be of radar or electrical type.

From the Doppler unit V information is transmitted as indicated at 452 through the unit 448 to the electrical adder unit 453 in the correction unit VI. The lines 152 and 155 from the inertial unit I both lead to the resolver unit 456 and the gate unit 457. From the resolver 456 information is supplied at 457 to the differential at 453 from where it goes by way of connection 458 to the comparator 459.

From the comparator 459 the information flows at 460 through the clutch arrangement 461 which is actuated from the gate 457 by the line 462.

If the roll or pitch indication from the inertial unit I to the gate unit 457 exceeds a certain value, the clutch 461 will be opened. The opening of the clutch 461 will establish disconnection between the velocity information measured by the Doppler unit V coming in at 452.

With the clutch 461 closed, the information will flow to the differential 463 and thence by the connection 466 to the torquer 467 to the differential 185.

The Doppler unit V will more accurately measure the velocity than the inertial unit I and when it supplies a signal through the closed clutch 461 to the torquer 213, this will cause precession of the gyroscope F which measures the longitudinal velocity. There will be no connection between the Doppler unit V and the other gyroscope A. The comparator 459 also has a connection 468 to the indicator 469 which may be set by the initial setting member 470.

The comparator unit 459 will receive a signal from the Doppler unit V at 458 and also from the receiver unit VII through the connection at 459a. This signal from the resolver unit 456 is derived from the inertial unit I by the connection 152 and will give the necessary correction for roll of the airplane.

The difference between the signal from the Doppler unit V supplied from the differential by the connection 452 and that from the inertial unit I supplied by the connection 152 will supply the correction back to the torquer unit 213. From the torquer unit 213 the correction goes to the longitudinal gyroscope F.

The comparator 459 may be a differential gearing if mechanical, or a potentiometer with separate drives for the winding and brush.

The gate arrangement 457 may consist of a series of relays which will be operated when the voltage exceeds a certain value to open the switch 461.

Referring to FIG. 5, there is shown within the dot and dash lines a computer VIII in diagrammatic form for indicating latitude and longitude. The shaft 300 is externally actuated and feeds the north-south velocity component to the integrator 316–318. The shaft 301 is also externally actuated and feeds the east-west velocity component to the integrator 315–321.

The integrator disks 315 and 316 are driven by constant speed shafts 318 and 319 which may be actuated by synchronous motors or by clocks. The integrators will also be provided with the adjustable friction driven wheels 321 and 322.

The input shafts 300 and 301 will cause the friction wheels 321 and 322 to change their position upon the disks 315 and 316 closer or father from the center lines.

Now, referring to the latitude system, the rotation of the wheel 301 will be communicated to the differential 309 to the meter 312. The differential 309 will also receive the manual adjustment by the hand wheel 331 and the shaft 332 for initial setting.

The differential transmitted change in latitude to the latitude indicator 312 will give a correct latitude indication once it has been initially set by the manual adjustment 331 through the differential gearing 309.

The latitude indicator shaft will also have a connection at 360 to move the axis of rotation of the rotating hemisphere 361 of the hemispherical integrator which also acts as a resolver to obtain the sine and cosine of the latitude.

The friction wheels 362 and 363 have fixed axes and will ride lightly upon the outside frictional face of the hemisphere 361. The rotational velocity of the wheels 362 and 363 will increase the farther they are from the central point of the hemisphere and the closer they are to the edges of the hemisphere 361. The hemisphere 361 is rotated by the shaft 366. The shaft 366 is driven through the differential gearing 368 by the shaft 369 from the torque amplifier 408–411.

The shaft 366 may also be driven by a clock shaft 367 through the differential gearing 368. The differential 368 and the clock shaft 367 may be omitted, but are used where the input also includes an additional velocity component resulting from rotation of the earth about its axis.

Referring to FIG. 5, the differential nut 307 may be rotated upon the screw 402. When the screw 402 is rotated with respect to the nut 307, the shaft will be moved laterally, as indicated by the double arrow 410, through the thrust ball bearing unit 408.

The thrust ball bearing unit 408 takes up the lateral thrust resulting from differential movement of the nut 307 and the screw therewithin.

The clutch gears 411 are driven in opposite direction from the motor 416.

The central clutch plate will be fixed to the shaft 409 so that it will be moved longitudinally with the shaft 409 to clutch with either clutch gear and be turned in one or the other direction.

The end of the shaft 409 is provided with a connection to the shaft 418. The shaft 418 leads to the differential gearing 419.

The differential gearing 419 in turn drives the longitudinal indicator dial 349. The initial adjustment is inserted into the indicator 349 by the manual adjustment 421 and the shaft 422.

The wheel 363 may be used to correct the output of an azimuth gyroscope IV through shaft 405 which is part of the equipment supplying velocity information to the resolver VII.

The arrangement inside of the velocity resolver VII is diagrammatically indicated in FIG. 5 by the vectors 500 to 504. The line 500 is the longitudinal velocity component originating from the inertial unit I.

The line 501 is the transverse or athwartship component from the inertial unit I.

The vector or component 502 is the longitudinal velocity component corrected for the earth's rotation.

Vector 501 is the total athwartship velocity component while 501b is part of the vector 501 corrected for the earth's rotation.

Component 503 is the north-south velocity component. Component 504a is the linear velocity of the earth while vector 504b is the east-west velocity component.

It is to be noted that the total component 504 is fed via shaft 301 as east-west velocity transmission to latitude-longitude computer VIII.

The device M receives information as to change in frequency of supply voltage to the gyroscope motors and compensates for resulting changes in rotor speed. $\Delta_f$ represents a change in frequency of supply voltage.

The device R receives altitude information and also changes in radius of earth with latitude. This information goes into the circuit to provide suitable correction.

The electrical or mechanical arrangement inside of the velocity resolver VII may widely vary. It may include a plurality of inter-connected rotating slides and swinging screws and nuts.

By mounting the gyroscopes A and F pendulously it is possible to obtain both roll and pitch information as well as velocity information both fore and aft and athwartship.

This is quite different from positioning the spin axes horizontally since by mounting the spin axes vertically it is possible to obtain acceleration components and the applicants' double pendulous gyroscope arrangement serves as an accelerometer and gives information over the wide range which is automatically integrated, avoiding the difficulties involved with separate integrators necessary with ordinary accelerometers of the pendulous or piston type.

While there has been herein described a preferred form of the invention, it should be understood that the same may be altered in details and in relative arrangement of parts within the scope of the appended claims.

What is claimed is:

1. In a double gyroscope system for a vehicle moving on the earth, fore and aft and athwartship gyroscopes having parallel spin axes and having their respective outer gimbal axes and inner gimbal axes at right angles to each other, said gyroscopes being suspended pendulously about one of said gimbal axes, a computing system to determine the position of the vehicle on the earth, and means actuated by the movement of the gyroscopes about said pendulous axes to furnish roll, pitch and angular rate information to said computing system.

2. A method of sensing fore-and-aft and athwartship acceleration and determining the corresponding velocity changes which comprises providing two gyroscopes having spin axes directed toward the center of the earth and positioning their inner gimbal axes at right angles to each other and positioning their outer gimbal and cardan axes at right angles to the tilting axes and to each other, said gyroscopes both being pendulously suspended around the outer gimbal and cardon axes and deriving fore-and-aft and athwartship velocity modified information from the rotation of the gyroscopes about their inner gimbal axes, modifying said information in a computer system, feeding said modified information back into the gyroscope system to keep the system continuously aligned with respect to the center of the earth, the pendulous suspension giving the effect of 84 minute tuning.

3. In a double gyroscope system for a vehicle moving on the earth, fore-and-aft and athwartship gyroscopes having parallel spin axes and having their respective outer gimbal axes and inner gimbal axes at right angles to each other, said gyroscope being suspended pendulously about one of said gimbal axes, a computing system to determine the position of the vehicle on the earth, and means actuated by the movement of the gyroscope about said pendulous axes to furnish information to said computing system.

4. In a pendulously suspended double gyroscope system having vertical spin axes and horizontal outer cardan and inner tilting axes for an air-borne vehicle moving above the surface of the earth to give information as to latitude, longitude and velocity, two superimposed gyroscopes positioned above each other with vertical spin axes, one gyroscope being a fore and aft acceleration measuring gyroscope and the other being athwartships acceleration measuring gyroscope and both gyroscopes being integrating accelerometers, outside gimbal cardan bearings for each gyroscope, outside gimbal tilting bearings for each gyroscope, outside gimbal cardan rings for each gyroscope connected to said cardan bearings, inside tilting gimbal rings for each gyroscope connected to said tilting bearings, a common horizontal platform carrying said gyroscopes, bearings and rings said tilting axes being offset vertically so as to suspend said gyroscope pendulously, electrical pick-offs associated with said bearings, roll and pitch servo and synchro motors to exert a force upon said gyroscopes and circuitry to convey signals from said electrical pick-offs to said motors to actuate the same, said gyroscopes being pendulously suspended about their outer cardan axes.

5. The system of claim 4, a roll cardan being provided outside of and carrying said platform.

6. The system of claim 4 in which the said bearings are mercury flotation bearings and in which each gyroscope serves as an 84 minute pendulum.

No references cited.

FRED C. MATTERN, JR., *Primary Examiner.*

BROUGHTON G. DURHAM, *Examiner.*

P. W. SULLIVAN, *Assistant Examiner.*